United States Patent
Cheng

(10) Patent No.: US 10,384,319 B2
(45) Date of Patent: Aug. 20, 2019

(54) MAGNETIC PLATE FOR ATTRACTING CARTRIDGE

(71) Applicant: Ningbo Newland Magnet Industry Corporation Limited, Ningbo, Zhejiang Province (CN)

(72) Inventor: Tinghai Cheng, Ningbo (CN)

(73) Assignee: NINGBO NEWLAND MAGNET INDUSTRY CORPORATION LIMITED, Ningbo, Zhejiang Province (CN)

( * ) Notice: Subject to any disclaimer, the term of this patent is extended or adjusted under 35 U.S.C. 154(b) by 132 days.

(21) Appl. No.: 15/720,720

(22) Filed: Sep. 29, 2017

(65) Prior Publication Data

US 2019/0009378 A1 Jan. 10, 2019

(30) Foreign Application Priority Data

Jul. 5, 2017 (CN) ...................... 2017 2 0808724 U

(51) Int. Cl.
*H01F 7/20* (2006.01)
*B23Q 3/15* (2006.01)
(Continued)

(52) U.S. Cl.
CPC .............. *B23Q 3/15* (2013.01); *B25B 11/002* (2013.01); *B65G 59/04* (2013.01); *B65H 3/16* (2013.01)

(58) Field of Classification Search
CPC ......... H01F 7/0252–0257; H01F 7/021; H01F 7/206; Y10S 211/01
(Continued)

(56) References Cited

U.S. PATENT DOCUMENTS 2,372,685 A * 4/1945 Schaich .................. F42B 39/08
198/803.6
2,435,735 A * 2/1948 Briggs ................. B23Q 3/1546
335/285
(Continued)

*Primary Examiner* — Alexander Talpalatski
(74) *Attorney, Agent, or Firm* — Hamre, Schumann, Mueller & Larson, P.C.

(57) ABSTRACT

The present invention relates to a magnetic plate for attracting cartridges. The magnetic plate comprises an upper cover, a support frame and a lower cover. The upper cover, the support frame and the lower cover are connected fixedly in order from top to bottom. The upper cover and the lower cover are engaged and form a case. The support frame is positioned within the case. Magnetic components are mounted between the support frame and the lower cover. The magnetic components comprise metal members and magnetic steel members connected fixedly to the metal members. The metal members are stuck on the bottom surface of the support frame. The metal steel members include first magnetic steel members and second magnetic steel members. The first magnetic steel members are arranged on the upper surface of the metal members and pass upwards through the support frame, and the second magnetic steel members are arranged on the lower surface of the metal members and pass through downwards through the lower cover. The N poles of the first magnetic steel members and the second magnetic steel members are arranged opposed to each other. The magnetic plate of the present invention has strong magnetic properties and thus can firmly attracting cartridges and holding the magnetic plate itself firmly on other metal surface. The area that can storage cartridges are large. The magnetic plate of the invention has simple structure, simple installation and production assembly. The magnetic plate has a small thickness and high space utilization rate.

6 Claims, 4 Drawing Sheets

(51) Int. Cl.
  *B25B 11/00* (2006.01)
  *B65H 3/16* (2006.01)
  *B65G 59/04* (2006.01)

(58) Field of Classification Search
  USPC .................................................. 335/285–286
  See application file for complete search history.

(56) References Cited

U.S. PATENT DOCUMENTS

| | | | | |
|---|---|---|---|---|
| 2,966,992 | A * | 1/1961 | Dunkelberger | B25H 3/04 211/1 |
| 5,196,818 | A * | 3/1993 | Anderson | A45F 5/00 223/109 A |
| 5,760,668 | A * | 6/1998 | Testa | B23Q 3/1546 206/350 |
| 5,904,096 | A * | 5/1999 | Fawcett | B41F 27/02 101/389.1 |
| 6,229,422 | B1 * | 5/2001 | Pignataro | H01F 7/206 335/285 |
| 6,288,623 | B1 * | 9/2001 | Janzen | B66C 1/04 335/289 |
| 6,489,871 | B1 * | 12/2002 | Barton | B25B 11/002 335/285 |
| 8,031,038 | B2 * | 10/2011 | Kimura | B29C 45/1742 335/285 |
| 9,601,250 | B2 * | 3/2017 | Ding | H01F 7/0252 |

* cited by examiner

MAGNETIC PLATE FOR ATTRACTING CARTRIDGE

TECHNICAL FIELD

The present invention relates to a magnetic plate, more specifically, to a magnetic plate for attracting cartridges.

BACKGROUND

Cartridges are usually stored in a storage box, which is commonly provided, depending on cartridges, with a cartridge groove through which a row of cartridges pass in order, in order to facilitate the fetch of the cartridges. This way of storing cartridges is apt to cause undesired damage when the cartridges are being put in or taken out. Currently, there is almost no commercially available device which stores cartridges with the aid of magnetic attraction.

SUMMARY

The technical problem to be solved by the present invention is to provide a magnetic plate for attracting cartridges which has strong magnetism and attraction force.

In order to solve the technical problem mentioned above, the present invention provides a magnetic plate for attracting cartridges. The magnetic plate comprises an upper cover, a support frame and a lower cover. The upper cover, the support frame and the lower cover are connected fixedly in order from top to bottom. The upper cover and the lower cover are engaged and form a case. The support frame is positioned within the case. Magnetic components are mounted between the support frame and the lower cover. The magnetic components comprise metal members and magnetic steel members connected fixedly to the metal members. The metal members are stuck on the bottom surface of the support frame. The metal steel members include first magnetic steel members and second magnetic steel members. The first magnetic steel members are arranged on the upper surface of the metal members and pass upwards through the support frame, and the second magnetic steel members are arranged on the lower surface of the metal members and pass through downwards through the lower cover. The N poles of the first magnetic steel members and the second magnetic steel members are arranged opposed to each other.

Further, the metal member to which a first magnetic steel member corresponds to is referred to as a first metal plate, and the metal member to which a second magnetic steel member corresponds to is referred to as a second metal plate. A plurality of second metal plates are stuck on the lower surface of the support frame laterally, and the second metal plates are equally spaced. The first metal plates extent along the long side of the case and are stuck at the both sides of the second metal plates.

Further, the area of contact between the first magnetic steel member and the first metal plate is less than the area of the first metal plate, and likewise the are of contact between the second magnetic steel member and the second metal plate is less than the area of the second metal plate.

Further, the support frame is provided, at its position corresponding to the positions of the first magnetic steel members, with first openings for revealing portions of the first magnetic steel members. The lower cover is provided, at its position corresponding to the positions of the second magnetic steel member, with second openings for revealing portions of the second magnetic steel members.

Further, the first magnetic steel member having multiple layers and sections are fixedly attached to the first metal plate, and the second magnetic steel member having multiple layers are fixedly attached to the second metal plate.

Further, the first magnetic steel member is strip-shaped, and the second magnetic steel member is circular. The first metal plate is a strip-shaped iron plate, and the second metal plate is a circular iron plate. Correspondingly, the first opening is a strip-shaped, and the second opening is circular.

Compared with the prior art, the present invention has following advantages. The magnetic plate of the present invention has strong magnetic properties and thus can firmly attracting cartridges and holding the magnetic plate itself firmly on other metal surface. The area that can storage cartridges are large. The magnetic plate of the invention has simple structure, simple installation and production assembly. The magnetic plate has a small thickness and high space utilization rate.

DETAILED DESCRIPTION

The invention will be described in further detail with reference to the accompanying drawings.

Figure 1:
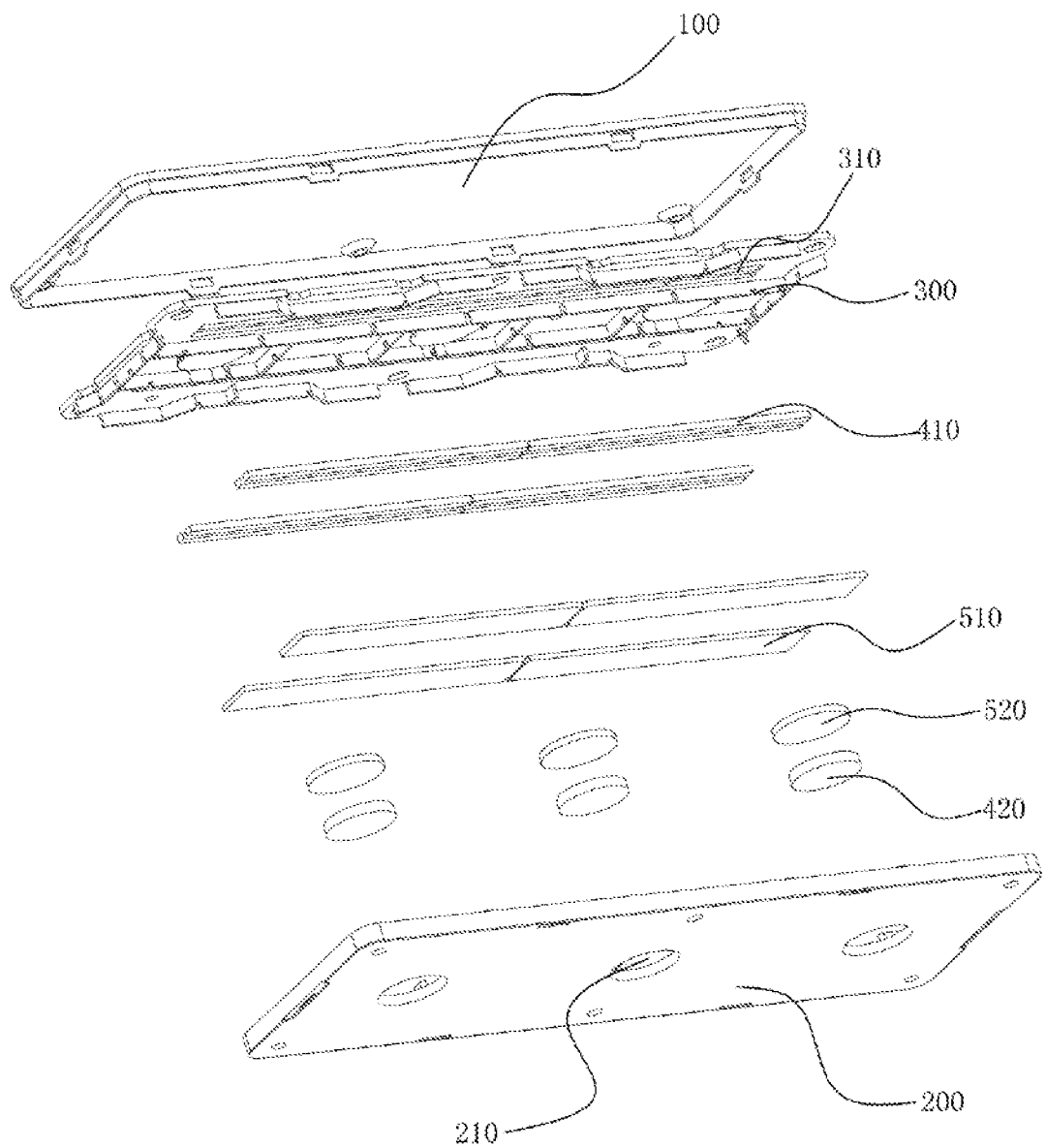
FIG. 1 is an explosive view of a magnetic plate for attracting cartridges according to the present invention.
Figure 2:
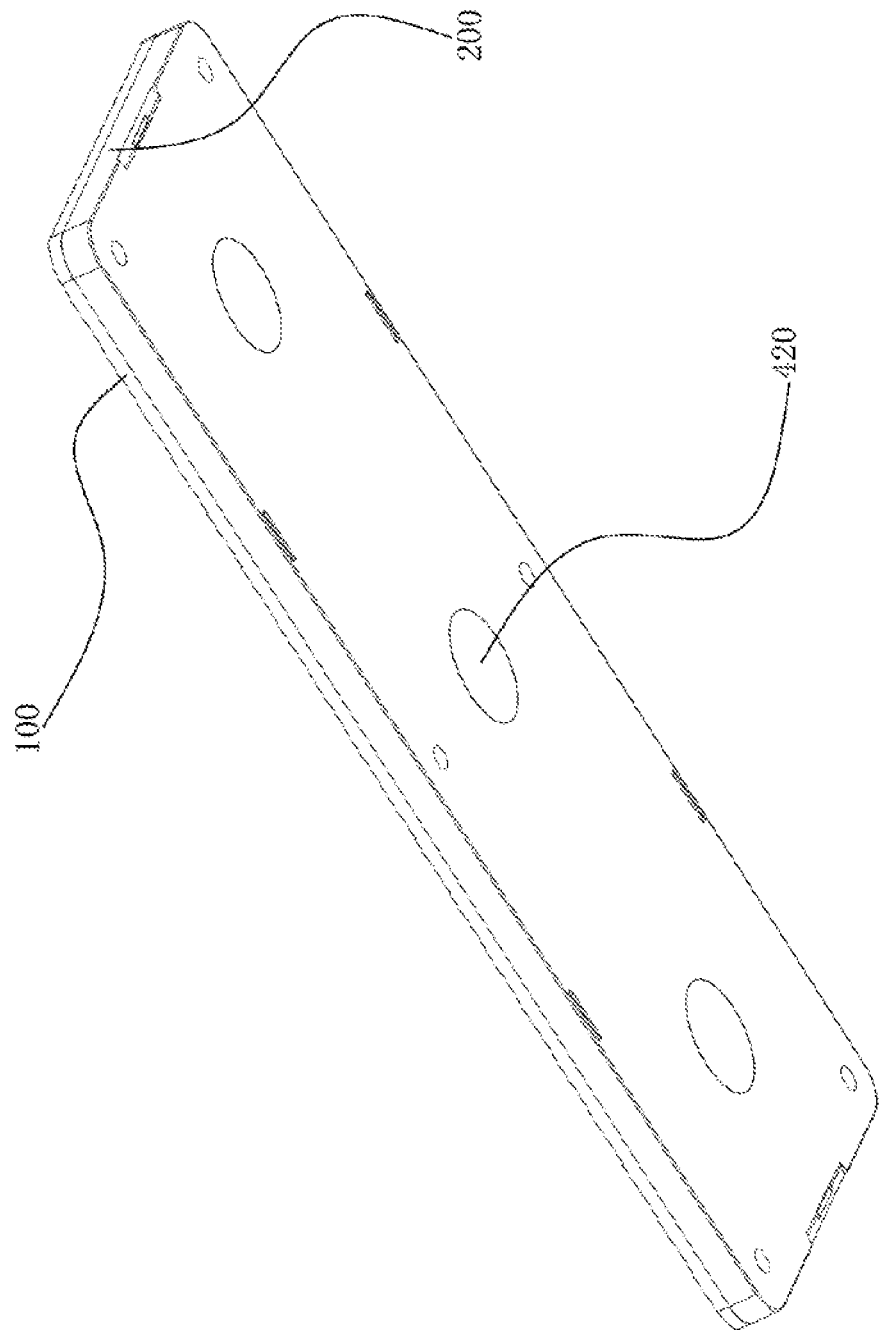
FIG. 2 schematically illustrates a magnetic plate for attracting cartridges according to the present invention.
Figure 3:
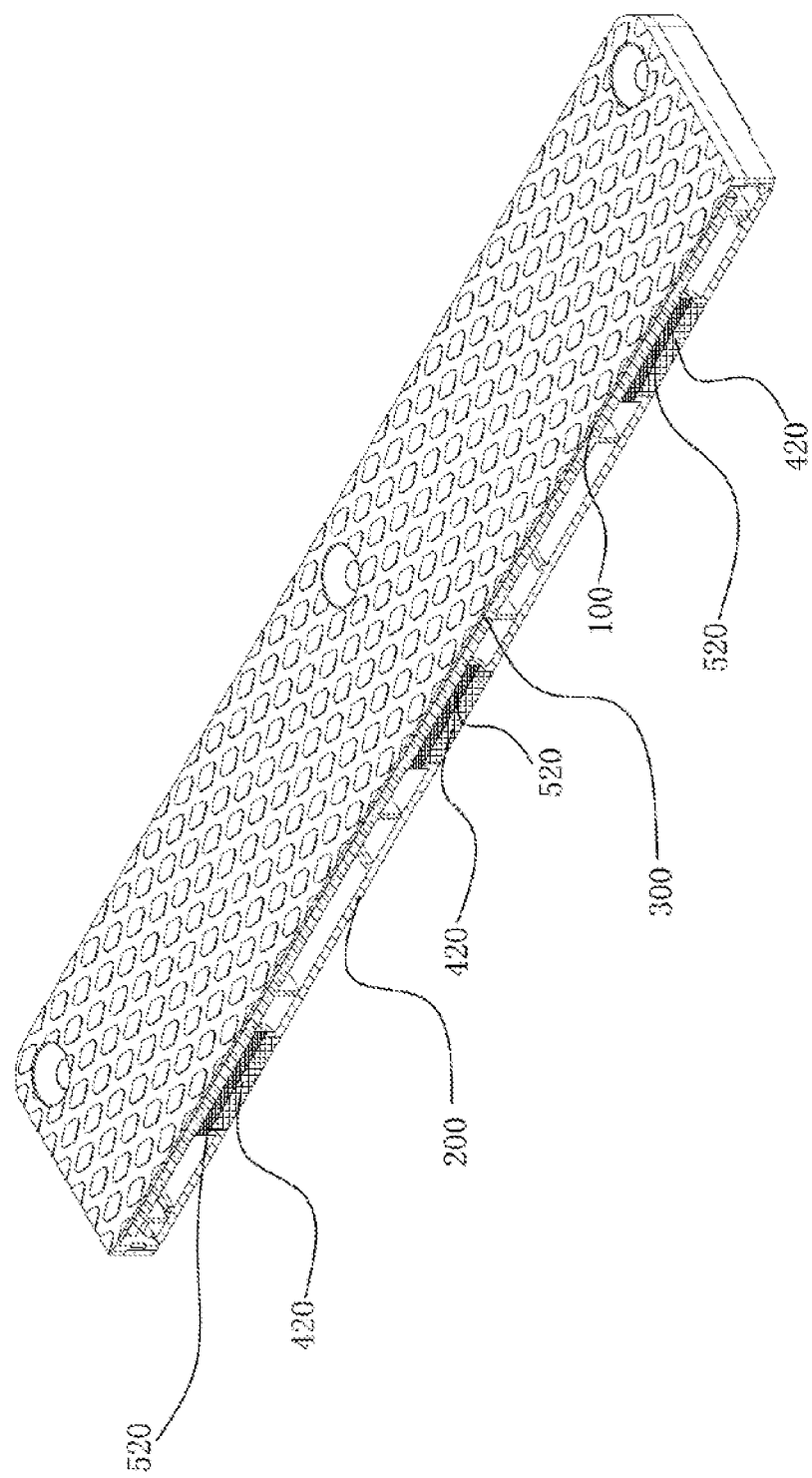
FIG. 3 is a sectional view of a magnetic plate for attracting cartridges according to the present invention.
Figure 4:
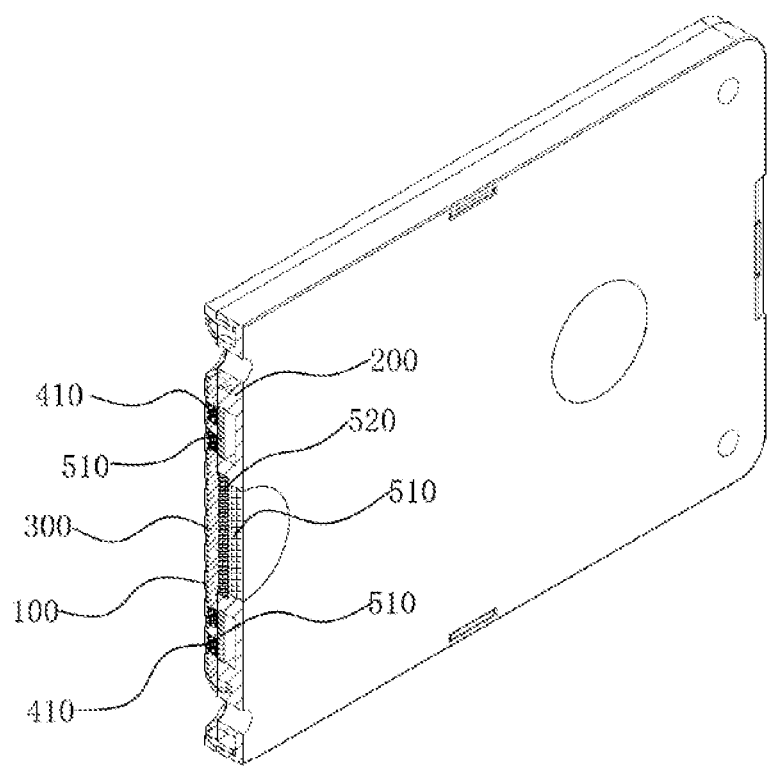
FIG. 4 is a sectional view of the present invention from another angle.

As shown in FIG. 1 to FIG. 4, the present embodiment provides a magnetic plate for attracting cartridges. The magnetic plate comprises, from top to bottom, an upper cover 100, a support frame 300 and a lower cover 200 which are connected fixedly in order. The support frame 300 is positioned within a case formed by the upper cover 100 and the lower cover 200. Magnetic components are mounted between the support frame 300 and the lower cover 200. The magnetic components comprise metal members and magnetic steel members connected fixedly to the metal members. The metal members are stuck on the bottom surface of the support frame 300. The metal steel members include first magnetic steel members 410 and second magnetic steel members 420. The first magnetic steel members 410 are arranged on the upper surface of the metal members and pass upwards through the support frame 300, and the second magnetic steel members 420 are arranged on the lower surface of the metal members and pass through downwards through the lower cover 200. The N poles of the first magnetic steel members 410 and the second magnetic steel members 420 are arranged opposed to each other.

The metal member to which a first magnetic steel member 410 corresponds to is referred to as first metal plate 510, and the metal member to which a second magnetic steel member 420 corresponds to is referred to as second metal plate 520. A plurality of second metal plates 520 are stuck on the lower surface of the support frame 300 laterally, and the second metal plates 520 are equally spaced. The first metal plates 510 extent along the long side of the case and are stuck at the both sides of the second metal plates 520.

The area of contact between the first magnetic steel member 410 and the first metal plate 510 is less than the area of the first metal plate 510, and likewise the area of contact between the second magnetic steel member 420 and the second metal plate 520 is less than the area of the second metal plate 520.

The support frame 300 is provided, at its position corresponding to the positions of the first magnetic steel members 410, with first openings 310 for revealing portions of the first magnetic steel members 410. The lower cover 200 is provided, at its position corresponding to the positions of the second magnetic steel member 420, with second openings 210 for revealing portions of the second magnetic steel members 420.

In the present embodiment, the first magnetic steel member 410 is strip-shaped, and the second magnetic steel member 420 is circular. The first metal plate 510 is a strip-shaped iron plate, and the second metal plate 520 is a circular iron plate. Correspondingly, the first opening 310 is strip-shaped, and the second opening 210 is circular.

In the present embodiment, the strip-shaped magnetic steel members having multiple layers and sections are fixedly attached to the strip-shaped iron plate, and the circular magnetic steel members having multiple layers are fixedly attached to the circular iron plate. The areas of the strip-shaped magnetic steel members and the circular magnetic steel members that are in contact with their corresponding iron plates are less than the areas of their corresponding iron plate respectively, so that the magnetic steel members can be firmly attached to the iron plates. The upper cover of the magnetic plate is made of elastic plastics, so that the cartridge can be prevented from being scratched by an overly rigid upper cover when it is placed on or taken off the magnetic plate.

In the present embodiment, the magnetic components are distributed symmetrically, so as to make the center of gravity of the plate located at the geometric center of the plate. The distribution of the magnetic components may be varied depending on the requirement of the production. In the present embodiment, the magnetic steel member is strip-shaped or circular. The magnetic plate is firmly attached to the surface of a metal panel with the aid of the circular magnetic steel members so as to reduce the area of the magnetic steel members. Some magnetic steel members are configured strip-shaped for the purpose of attracting more cartridges that are arranged orderly on the upper cover. The strip-shaped and circular magnetic steel members may also be replaced by the magnetic steel members of any other shape as required. In the present embodiment, the magnetic plate may be fixed to a non-metal surface by riveting the lower cover, and a screwdriver is provided to the magnetic plate for taking off the magnetic plate from a metal surface conveniently.

In the present embodiment, the metal member is made of iron or any other material. The metal member and the magnetic steel member are fixed by means of a thermally fused adhesive member, or in other common way, such as by welding or glue.

The present embodiment utilizes two magnetic steel members which are arranged with their magnetic poles opposite to each other. One kind of magnetic steel members are used for attracting the magnetic plate to the other metal surface. The other kind of magnetic steel members are used for attracting cartridges. The arrangement of the magnetic steel members can realize large areas for attracting cartridges and fixing the magnetic plate.

Although the preferred embodiments of the present invention have been described above in detail, the person skilled in the art should clearly understand that various modification and alteration to the present invention are possible. Any modification, equivalent replacement and improvement within the spirits and principles of the present invention all fall into the protection scope of the present invention.

The invention claimed is:

1. A magnetic plate for attracting cartridges, comprising: an upper cover (100), a support frame (300) and a lower cover (200), the upper cover (100), the support frame (300) and the lower cover (200) are connected fixedly in order from top to bottom, the upper cover (100) and the lower cover (200) are engaged and form a case, the support frame (300) is positioned within the case, characterized in that, magnetic components are mounted between the support frame (300) and the lower cover (200), the magnetic components comprises metal members and magnetic steel members connected fixedly to the metal members, the metal members are stuck on the bottom surface of the support frame (300), the metal steel members include first magnetic steel members (410) and second magnetic steel members (420), the first magnetic steel members (410) are arranged on the upper surface of the metal members and pass upwards through the support frame (300), the second magnetic steel members (420) are arranged on the lower surface of the metal members and pass through downwards through the lower cover (200), and the N poles of the first magnetic steel members (410) and the second magnetic steel members (420) are arranged opposed to each other.

2. The magnetic plate for attracting cartridges according to claim 1, characterized in that, the metal member to which the first magnetic steel member (410) corresponds to is referred to as a first metal plate (510), and the metal member to which a second magnetic steel member (420) corresponds to is referred to as a second metal plate (520), a plurality of second metal plates (520) are stuck on the lower surface of the support frame (300) laterally, and the second metal plates (520) are equally spaced, the first metal plates (510) extent along the long side of the case and are stuck at the both sides of the second metal plates (520).

3. The magnetic plate for attracting cartridges according to claim 2, characterized in that, the area of contact between the first magnetic steel member (410) and the first metal plate (510) is less than the area of the first metal plate (510), and likewise the area of contact between the second magnetic steel member (420) and the second metal plate (520) is less than the area of the second metal plate (520).

4. The magnetic plate for attracting cartridges according to claim 3, characterized in that, the support frame (300) is provided, at its position corresponding to the positions of the first magnetic steel members (410), with first openings (310) for revealing portions of the first magnetic steel members (410), and the lower cover (200) is provided, at its position corresponding to the positions of the second magnetic steel member (420), with second openings (210) for revealing portions of the second magnetic steel members (420).

5. The magnetic plate for attracting cartridges according to claim 4, characterized in that, the first magnetic steel member (410) having multiple layers and sections are fixedly attached to the first metal plate (510), and the second magnetic steel member (420) having multiple layers are fixedly attached to the second metal plate (520).

6. The magnetic plate for attracting cartridges according to claim 5, characterized in that, the first magnetic steel member (410) is strip-shaped, and the second magnetic steel member (420) is circular, the first metal plate (510) is a strip-shaped iron plate, the second metal plate (520) is a circular iron plate, the corresponding first opening (310) is strip-shaped, and the second opening (210) is circular.

\* \* \* \* \*